No. 692,585. Patented Feb. 4, 1902.
W. H. ADAMS.
CANE STUBBLE CLEANER.
(Application filed Sept. 24, 1901.)

(No Model.) 2 Sheets—Sheet 1.

Witnesses
Geo. E. Prech.
Chas. P. Wright Jr.

Inventor
W. H. Adams
By A. S. Pattison
Attorney

THE NORRIS PETERS CO., PHOTO-LITHO., WASHINGTON, D. C.

No. 692,585. Patented Feb. 4, 1902.
W. H. ADAMS.
CANE STUBBLE CLEANER.
(Application filed Sept. 24, 1901.)
(No Model.) 2 Sheets—Sheet 2.
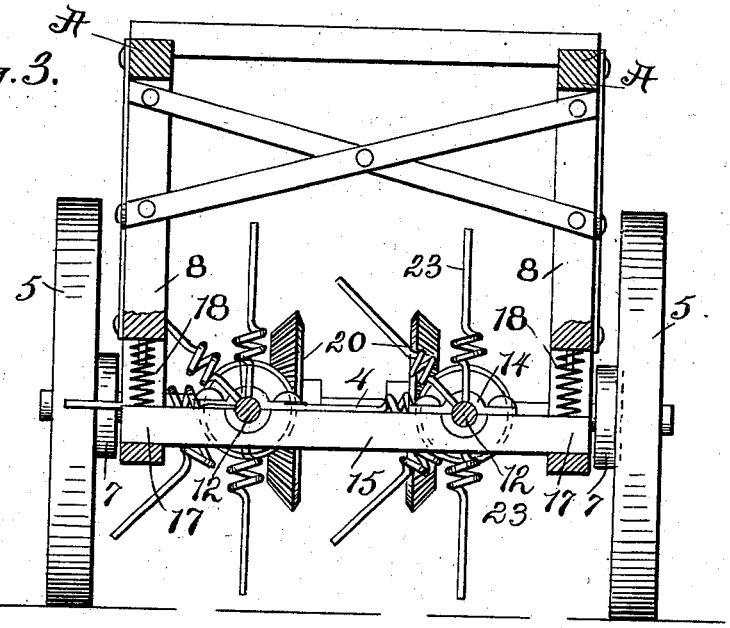
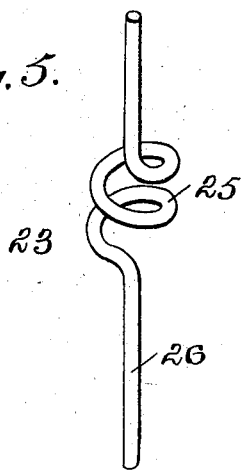
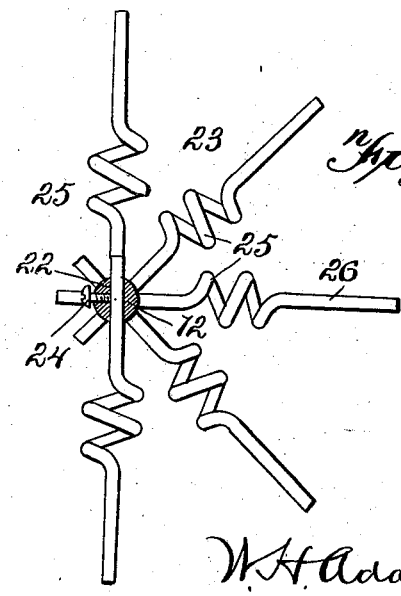
Witnesses
Geo. E. Frech.
Chas. P. Knight Jr.
Inventor.
W. H. Adams
By A. S. Pattison
Attorney

United States Patent Office.

WILLIAM H. ADAMS, OF LAFAYETTE, LOUISIANA, ASSIGNOR OF ONE-HALF TO F. FIDEL LOMBARD, OF LAFAYETTE, LOUISIANA.

CANE-STUBBLE CLEANER.

SPECIFICATION forming part of Letters Patent No. 692,585, dated February 4, 1902.

Application filed September 24, 1901. Serial No. 76,420. (No model.)

*To all whom it may concern:*

Be it known that I, WILLIAM H. ADAMS, a citizen of the United States, residing at Lafayette, in the parish of Lafayette and State of Louisiana, have invented new and useful Improvements in Cane-Stubble Cleaners, of which the following is a specification.

My invention relates to improvements in cane-stubble cleaners, and pertains to a machine especially adapted for the cultivation of cane stubble or stalks, all of which will be fully described hereinafter.

The object of my invention is to provide a machine which is adapted to take the place of the hoe in removing the earth and grass from around the cane stubble or stalk, thus effecting a considerable saving in labor and expense.

My machine is adapted to straddle a row of cane stubbles or stalks and to remove the earth and grass therefrom in the spring, thus permitting the light and heat to penetrate and cause the old stubble or stalk to germinate and produce another crop.

Figure 1:
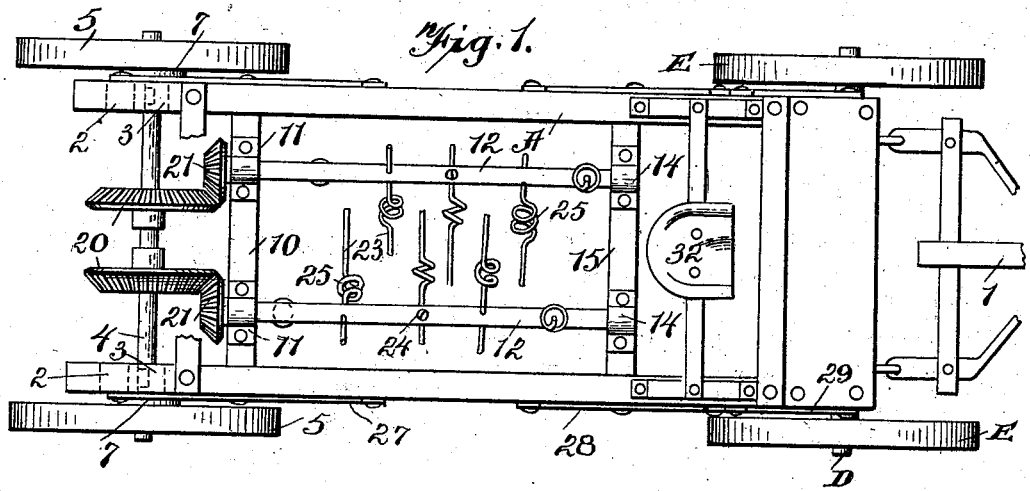
Figure 2:
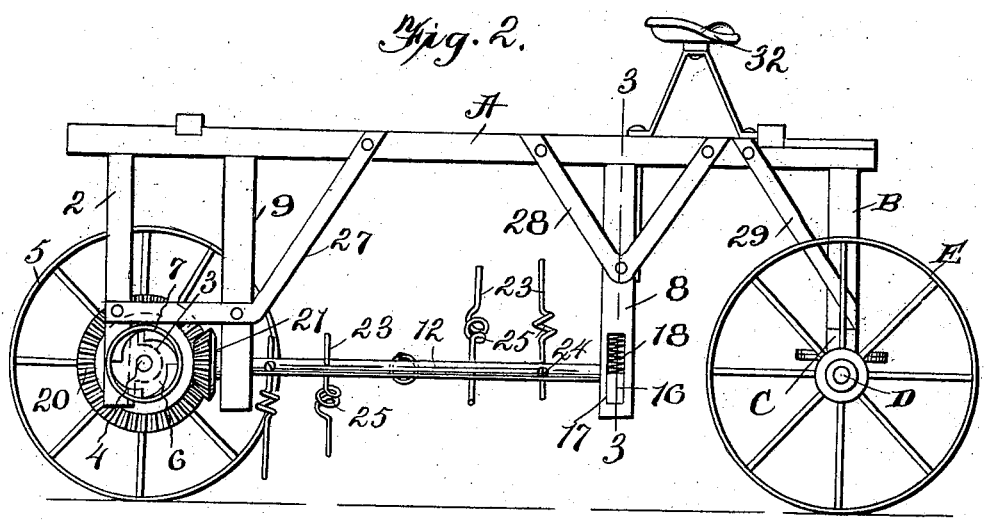
Figure 4:
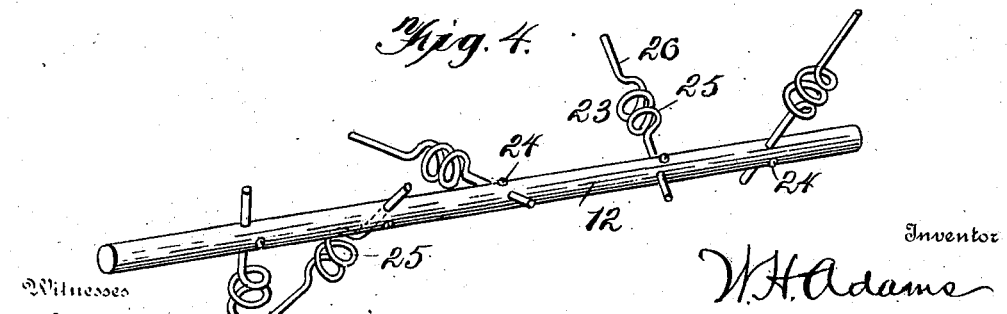

In the accompanying drawings, Figure 1 is a top plan view of a machine embodying my invention. Fig. 2 is a side elevation thereof. Fig. 3 is a transverse vertical sectional view on the line 3 3, Fig. 1, and taken through the front shaft-supporting standard. Fig. 4 is a detached perspective view of one of the spring-finger shafts with the fingers attached thereto. Fig. 5 is an enlarged detached view of one of the spring-fingers. Fig. 6 is an enlarged sectional view of the spring-finger shafts, showing the means for securing the fingers therein.

The main and supporting frame of my machine consists of an upper rectangular portion A, provided at its forward end with the depending standards B, to the lower ends of which any form of bolster C is attached. The front axle D is swiveled at its center to the said bolster in any desired manner and carries at its ends suitable supporting-wheels E. A draft member 1, here shown in the form of a tongue, is suitably connected to the front axle, and to this draft member or tongue the animals to draw the machine are attached in the usual manner.

Depending from the rear end of the upper rectangular frame A are the standards 2, which carry at their lower ends journal-boxes 3 for the rear and driving shaft 4. Placed upon the end of the driving-shaft 4 are suitable driving-wheels 5, the said driving-wheels and the ends of the shaft having suitable ratchet connections 6, contained within suitable inclosing boxes or casings 7. This ratchet mechanism will permit the wheels to freely rotate backward independent of the driving-shaft, but when revolved forward will carry with them the driving-shaft, and the driving-shaft in turn will cause the operation of the cultivating mechanism, to be presently described.

Depending from opposite sides of the rectangular frame A are the forward standards 8 and the rear standards 9. Firmly connecting the lower ends of the rear standards 9 is a bar 10, and this bar 10 is provided with the journal-boxes 11, in which the rear ends of the spring-finger shafts 12 are journaled. The forward ends of these shafts are journaled in suitable boxes 14, which are arranged upon a transverse bar 15, the said transverse bar being supported by the lower ends of the standards 8. This bar 15 has reduced ends 16, which are adapted to move vertically in vertically-arranged slots 17, which are formed in the lower ends of the standards 8. Situated above the reduced ends 16 and the upper walls of the slots 17 are suitable springs 18, which serve to normally hold the bar 15 in its downward position, but will permit it to move upward against the tension of the springs for a purpose to be explained hereinafter.

Connected to the driving-shaft 4 are oppositely-arranged bevel-gears 20, which engage, respectively, the bevel-gears 21, secured to the rear ends of the shafts 12. The gears upon the ends of the shafts are arranged upon the outer side of the said bevel-gears 20, and thus cause the shafts to revolve in opposite directions.

Each of the shafts 12 is provided with a plurality of transversely-arranged spring-finger openings 22 and in which the spring-fingers 23 are adjustably attached through the medium of suitable set-screws 24. These removable and adjustable and reversible spring-fingers consist of about five-eighths spring-steel wire, and are provided with intermediate coils 25 and with straight ends 26. One of the straight ends 26 is secured within the opening of the shaft, while the other or outer straight end serves as the shafts are revolved to loosen and remove the earth from around the main stubble or stalk and to tear away or remove the grass, thus permitting the light and heat to penetrate the stalk and cause the old stalks to germinate and produce a crop. The spring-fingers are flexible and of such a size that they will loosen the dirt and remove the grass and earth without injury to the stalks or stubbles. Preferably the spring-fingers, and consequently the openings in the shafts in which the spring-fingers are placed, are arranged around the shaft in a spiral, which causes the fingers to engage the earth successively. This arrangement will permit the machine to run much easier and much more regularly than would be possible if all of the fingers engaged the earth simultaneously. Again, this arrangement of the spring-fingers practically covers all of the space around the stalk, in that one finger engaging the earth and the machine moving forward the succeeding finger takes up about where the preceding finger left off, which insures a thorough cultivation of the old cane-stalks.

The object in having the front ends of the shafts 12 movable vertically against spring-pressure through the medium of the vertically-movable bar 15 is to relieve the sudden shock and strain upon the shaft and spring-fingers when they strike a stump or rock.

Suitable stays 27, 28, and 29 serve to hold the depending standards firmly in their proper positions and to thoroughly brace them.

The spring-fingers being reversible, either end may be used for contact with the earth, and being adjustable they can be set to enter the earth at the desired depth, according to the condition thereof.

The cultivating mechanism, as will be seen from Fig. 2, is located sufficiently in rear of the front end of the machine to permit the front wheels to turn thereunder, and thus permit the machine to be turned around in a very short space for taking the succeeding row of stalks for cultivation, and the ratchet connection between the driving-wheels and the driving-axle permits the machine to be freely turned.

A suitable seat 32 is arranged on the frame A for the driver.

Preferably the gearing between the driving-shaft and the spring-finger shafts is such that the spring-finger shafts will revolve about three times to each revolution of the driving-shaft.

The machine constructed as above described is found to be very effective for the purpose described and to very materially reduce the cost of cultivating cane stubbles or stalks, as well as a great saving in time in the cultivation thereof.

Having thus described my invention, what I claim, and desire to secure by Letters Patent, is—

1. A cultivator of the character described, comprising a supporting-frame, a driving-shaft, a longitudinally-arranged spring-finger shaft geared to the driving-shaft, the forward end of the spring-finger shaft having a vertical movement, substantially as described.

2. A cultivator of the character described, comprising a supporting-frame, a driving-shaft, parallel longitudinally-arranged spring-finger shafts geared to the driving-shaft, and a plurality of transversely-arranged spring-fingers supported by each of said longitudinal shafts, substantially as described.

3. A cultivator of the character described comprising a supporting-frame, a driving-shaft, longitudinally-arranged parallel spring-finger shafts geared to the driving-shaft, each spring-finger shaft provided with a plurality of transversely-arranged spring-fingers, the said spring-fingers arranged upon each shaft in spiral relation, substantially as described.

4. A cultivator of the character described comprising a supporting-frame, a driving-shaft, parallel-arranged longitudinal spring-finger shafts geared to the driving-shaft, a transversely-arranged vertically-movable bar carrying journals for the forward ends of the spring-finger shafts, and springs serving to hold the transversely-arranged bar normally in its downward position, substantially as described.

5. A cultivator of the character described comprising a supporting-frame, a driving-shaft, a longitudinally-arranged spring-finger shaft geared to the driving-shaft, and a plurality of spring-fingers carried by the said longitudinal shaft, the spring-fingers consisting of an intermediate spiral and straight ends, substantially as described.

6. A cultivator of the character described, comprising a supporting-frame, a driving-shaft, longitudinally-arranged finger-shafts geared to said driving-shaft, the forward end of said spring-finger shafts mounted on a transverse vertically-movable bar, substantially as described.

7. A cultivator of the character described, comprising a supporting-frame, a driving-shaft, longitudinally-arranged finger-shafts geared to said driving-shaft, a transverse bar having its end resting in vertically-arranged slots and supporting the forward ends of the spring-finger shafts, substantially as described.

8. A cultivator of the character described, comprising a supporting-frame, a driving-shaft, longitudinally-arranged finger-shafts geared to said driving-shaft, a transverse bar having reduced outer ends resting in vertically-arranged slots carried by the frame, and said bar supporting the forward end of the finger-shafts, substantially as described.

9. A cultivator of the character described comprising a supporting-frame, a driving-shaft, longitudinally-arranged finger-shafts geared to said driving-shaft, a transverse bar having its ends resting within vertically-arranged slots carried by the frame and said bar supporting the forward end of the finger-shafts, and springs within said slots above said bars, substantially as described.

10. A cultivator of the character described, comprising a supporting-frame, a driving-shaft, longitudinally-arranged finger-shafts geared to the driving-shaft and having transverse openings therein, spring-fingers passing through said openings and means for securing said fingers therein, substantially as described.

11. A cultivator of the character described, comprising a supporting-frame, a driving-shaft, longitudinally-arranged finger-shafts geared to the driving-shaft, and having transverse openings therein, spring-fingers passing through said openings, and set-screws intersecting said openings and adapted to secure said fingers therein, substantially as described.

12. A cultivator of the character described, comprising a supporting-frame, a driving-shaft, longitudinally-arranged finger-shafts geared to the driving-shaft and having transverse openings therein, spring-fingers consisting of an intermediate spiral and straight ends, said ends adapted to enter the openings in the finger-shafts, and means for securing said fingers therein, substantially as described.

In testimony whereof I have hereunto set my hand in the presence of two subscribing witnesses.

WILLIAM H. ADAMS.

Witnesses:
   JOHN VIGNEAUX,
   F. LOMBARD.